US009199604B1

(12) United States Patent
Phillips

(10) Patent No.: US 9,199,604 B1
(45) Date of Patent: Dec. 1, 2015

(54) ALERT COVER FOR SEATBELT

(71) Applicant: Walter J. Phillips, McDonald, PA (US)

(72) Inventor: Walter J. Phillips, McDonald, PA (US)

( * ) Notice: Subject to any disclaimer, the term of this patent is extended or adjusted under 35 U.S.C. 154(b) by 0 days.

(21) Appl. No.: 14/821,856

(22) Filed: Aug. 10, 2015

Related U.S. Application Data

(60) Provisional application No. 62/035,597, filed on Aug. 11, 2014.

(51) Int. Cl.
*A62B 35/00* (2006.01)
*A44B 11/25* (2006.01)
*A44B 17/00* (2006.01)
*B60R 22/00* (2006.01)

(52) U.S. Cl.
CPC ............. *B60R 22/00* (2013.01); *A44B 11/2576* (2013.01)

(58) Field of Classification Search
CPC .................................................. A44B 11/2576
USPC ......................................................... 297/482
See application file for complete search history.

(56) References Cited

U.S. PATENT DOCUMENTS

| | | | | |
|---|---|---|---|---|
| 3,285,659 A * | 11/1966 | Robbins | B60R 22/00 | 297/482 X |
| 4,497,094 A * | 2/1985 | Morris | A44B 11/2576 | 220/284 |
| 4,502,194 A * | 3/1985 | Morris | A44B 11/2576 | 220/284 |
| 4,624,033 A * | 11/1986 | Orton | A44B 11/2573 | 24/579.11 |
| 4,674,303 A * | 6/1987 | Salcone, II | A44B 11/2576 | 206/807 |
| 4,675,954 A * | 6/1987 | Gullickson | A44B 11/2576 | 24/579.11 |
| 4,731,912 A * | 3/1988 | Boriskie | A44B 11/2576 | 24/487 |
| 4,791,711 A * | 12/1988 | Adams | A44B 11/2573 | 24/633 |
| 4,878,277 A * | 11/1989 | Portuese | A44B 11/2576 | 297/482 X |
| 4,921,273 A | 5/1990 | Weightman et al. | | |
| 4,939,824 A * | 7/1990 | Reed | A44B 11/2576 | 297/482 X |
| 4,961,251 A * | 10/1990 | Smith | A44B 11/2576 | 24/633 |
| 4,987,662 A * | 1/1991 | Haffey | A44B 11/2576 | 24/633 |
| 5,052,087 A * | 10/1991 | Portuese | A44B 11/2576 | 24/579.11 |
| 5,129,129 A * | 7/1992 | Collins | A44B 11/2576 | 24/579.11 |
| 5,189,767 A * | 3/1993 | Reitsma | A44B 11/2576 | 24/579.11 |
| 5,307,544 A * | 5/1994 | Quarberg | A44B 11/2576 | 24/579.11 |
| 5,442,840 A * | 8/1995 | Ewald | A44B 11/2576 | 24/579.11 |
| 5,617,617 A | 4/1997 | Gustin | | |
| 6,041,480 A * | 3/2000 | White | A44B 11/2576 | 24/487 |

(Continued)

*Primary Examiner* — Rodney B White
(74) *Attorney, Agent, or Firm* — McKay & Associates, P.C.

(57) ABSTRACT

A cover adapted to attach to and move along a seatbelt strap to intermittently cover and block the buckle. The back and each side extend down from the top surface with the underside substantially flat to thereby define the cover as wedged-shaped. A pair of tab members are formed at the back, the tab members defining a T-shaped opening at the back. The T-shaped opening is adapted to contain a strap of a seatbelt such that the cover is slidably retained on the strap, as a result, the cover can intermittently cover a buckle of the seat belt, i.e. until moved by a driver. In this manner, a driver intending to unlatch the seatbelt and leave the vehicle must first slide the physically deterring and visibly reminding cover away from the latch, thereby being reminded that a passenger may be in the rear of the vehicle.

9 Claims, 3 Drawing Sheets

(56) References Cited

U.S. PATENT DOCUMENTS

| | | | | | |
|---|---|---|---|---|---|
| 6,138,331 | A * | 10/2000 | Powers | A44B 11/2576 | 24/306 |
| 6,203,110 | B1 * | 3/2001 | Proteau | B60R 22/024 | 297/482 |
| 6,332,252 | B1 * | 12/2001 | Powers | A44B 11/2576 | 24/633 |
| 6,431,652 | B1 * | 8/2002 | Kennedy | A44B 11/2576 | 297/464 |
| 6,668,433 | B1 * | 12/2003 | Hood | A44B 11/2576 | 24/163 R |
| 6,769,157 | B1 * | 8/2004 | Meal | A44B 11/2576 | 220/284 |
| 6,988,297 | B2 * | 1/2006 | Willard | A44B 11/2576 | 24/633 |
| 7,159,284 | B2 * | 1/2007 | Gastaldi | A44B 11/2542 | 24/632 |
| 7,243,403 | B2 * | 7/2007 | Hoffman | A44B 11/2576 | 24/265 BC |
| 8,120,499 | B2 | 2/2012 | Ortiz | | |
| 8,393,061 | B2 * | 3/2013 | McGlynn | A44B 11/2576 | 24/198 |
| 8,695,175 | B2 | 4/2014 | Pi | | |
| 2002/0112327 | A1 * | 8/2002 | Baloga | A44B 11/2576 | 24/633 |
| 2005/0204523 | A1 * | 9/2005 | Smith | A44B 11/2576 | 24/633 |
| 2006/0096069 | A1 * | 5/2006 | Hoffman | A44B 11/2576 | 24/265 BC |
| 2007/0289111 | A1 * | 12/2007 | Mandarino | A44B 11/2576 | 24/633 |
| 2008/0055064 | A1 | 3/2008 | Keith et al. | | |
| 2008/0073141 | A1 | 3/2008 | Jaunarena-Ferrari | | |
| 2008/0179936 | A1 * | 7/2008 | Mirmikidis | B64D 11/062 | 297/482 |
| 2009/0072609 | A1 * | 3/2009 | Rogers | A44B 11/2561 | 297/482 |
| 2012/0264349 | A1 | 10/2012 | Ciampitti et al. | | |

* cited by examiner

ALERT COVER FOR SEATBELT

CROSS-REFERENCE TO RELATED APPLICATIONS

Benefit is hereby claimed to U.S. Provisional Application Ser. No. 62/035,597, filed Aug. 11, 2014, the contents of which are incorporated by reference.

BACKGROUND

1. Field of the Invention

The invention relates to seatbelt strap implements. Particularly, disclosed is an apparatus for alerting an automobile driver to the presence of a rear seat passenger such as a child or pet.

2. Description of the Related Art

Each year about 35-50 babies and toddlers die when they are accidentally left strapped in car safety seats or become trapped in vehicles that rapidly heat up. Vehicular heat stroke tragedies are avoidable, but unfortunately forever change the lives of parents, families, and communities forever. On a hot day an enclosed vehicle can reach over to 100° F. in about twenty seconds. Unnecessary deaths result from drivers forgetting their child and/or pet is left in an unattended, overheated vehicle.

Alarm or signaling systems which detect the presence of individuals throughout the vehicle are known in the art, traditionally taking the form of sensors at various locations that detect an increase in force, e.g. due to the weight of an object on the passenger seats. Other alert systems, specifically for a child's presence in the rear may comprise a cord with magnetic sensor. In U.S. Pat. No. 8,120,499 to Ortiz, a baby cord seat belt-like device, upon detachment, sends an audible signal which would alert and remind the caregiver that a child is still in the vehicle.

Such systems are complex, expensive, and cumbersome. Some drivers unfortunately already feel burdened by having to buckle their seatbelt, so an additional, pre-operation safety step might frequently be bypassed by the hurried driver. There is a need then for a simple, non-electrical and non-intrusive device which can remind a driver of the potential presence of a child or pet in the rear of the vehicle, as follows.

SUMMARY

The instant invention comprehends a cover-like member with tab members extending downward in wing-like fashion to define a pair of pockets through which the cover can engage a seatbelt strap. In use, the cover apparatus is slidably secured to the seatbelt strap such that it can be manipulated down onto the engaged latch to remind the driver that a child may be present in the vehicle.

Accordingly, what is provided is a wedge-shaped cover having a front edge, a back, a top surface, an underside and two sides. The front edge has front height less than a back height of the back such that the cover generally tapers from the back to the front when viewed in side elevation. The back and each side extend down from the top surface with the underside substantially flat to thereby define the wedged-shaped, or substantially triangular housing. A pair of tab members are formed at the back, each tab member substantially orthogonal to each side, the tab members shaped to define a generally T-shaped opening at the back. The T-shaped opening is adapted to contain a strap of a seatbelt such that the cover is slidably retained on the strap, as a result, the cover can intermittently cover a buckle of the seat belt, i.e. until moved by a driver. More particularly, the underside is adapted to abut the buckle such that a portion of the buckle is contained within the housing, as a result a release button of the buckle is at least partially unexposed unless the cover is manipulated away from the buckle. A housing side of the back is adapted to abut a latch of the seatbelt to prohibit further movement of the cover along the strap. In this manner, a driver intending to unlatch the seatbelt and leave the vehicle must first slide the physically deterring and visibly reminding cover away from the latch, thereby being reminded that a passenger may be in the rear of the vehicle.

DETAILED DESCRIPTION OF THE PREFERRED EMBODIMENT

Figure 1:
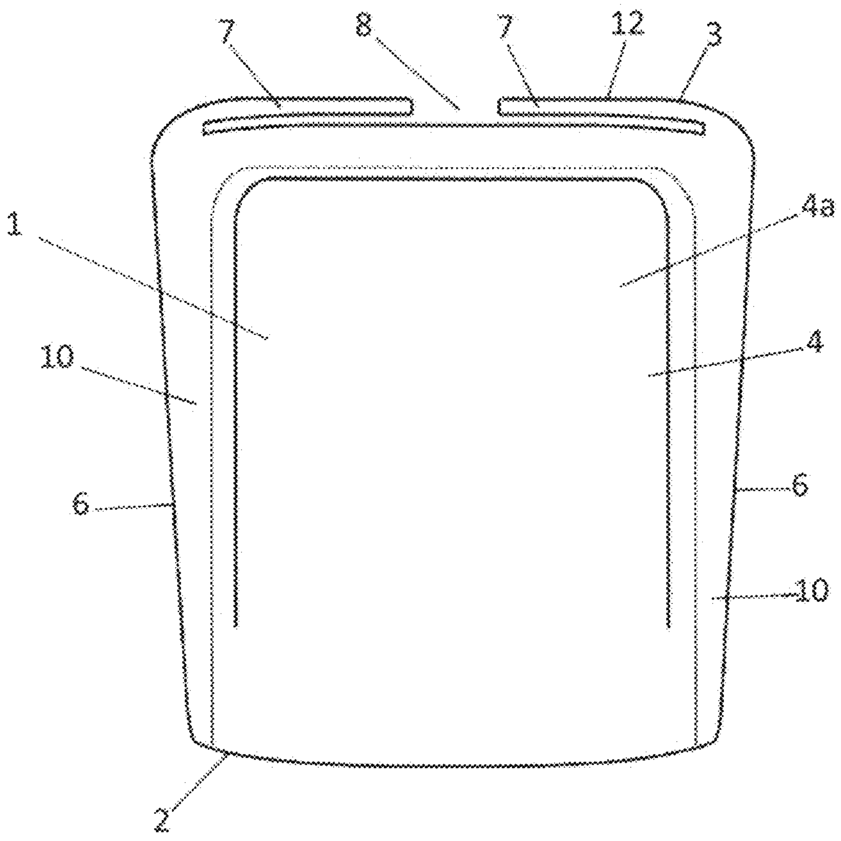
FIG. 1 shows a top elevation view of the instant alert cover.

Referencing then FIGS. 1-7, shown is the instant belt alert apparatus, comprehending a cover 1. The cover 1 is preferably one-piece and can be made of any lightweight, rigid or semi-rigid material such as metal, plastic or rubber, in the preferred embodiment plastic. Cover 1 has a front edge 2, a back 3, a top surface 4, an underside 5 and two sides 6. Top surface 4 may include indicia or logo material and may also have defined thereon an indent 4*a* to flatten out top surface 4 so as to provide a suitable surface for the indicia or logo material. All edges of cover 1 can be rounded off, for instance the back 3 may be slightly curved as shown as well as the front 2. The transition 10 from the sides 6 to the top surface 4 preferably is rounded off slightly. Since the cover 1 is grasped and manipulated by hand, these ergonomic features aid comfort.

Figure 7:
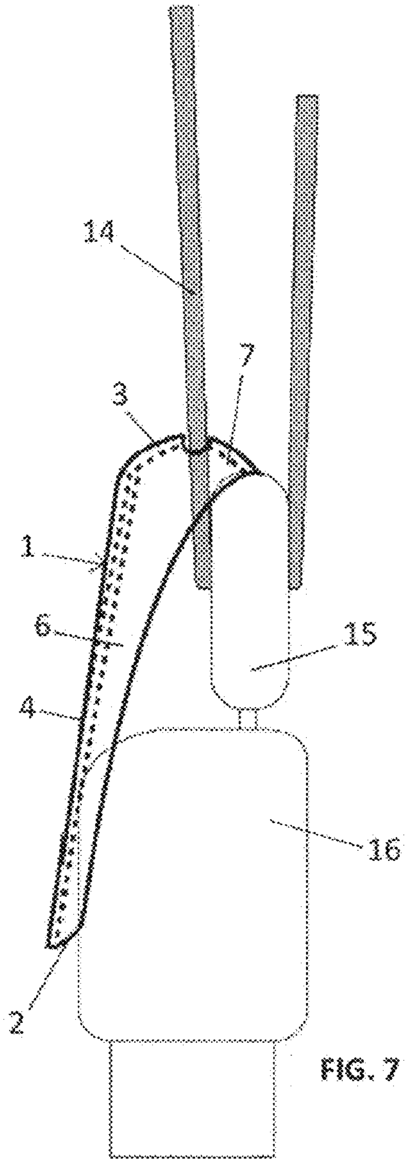
FIG. 7 shows a side elevation view of the device in use, slid down over the seatbelt latch mechanism.

The front edge 2 preferably has a front height which is less that a back height of the back 3, thus generally tapering from back 3 to front edge 2, as shown. "Generally" as it relates to tapering meaning the sides 6 get gradually smaller in height from back 3 to front edge 2 although this gradual dimensional change need not be consistent. Additionally, the back 3 and each side 6 extend down from the top surface 4 with the underside 5 being substantially flat to thereby define a generally wedge-shaped housing representing the interior definition of cover 1. "Substantially" as it relates to the flat underside 5 means either flat or near flat, e.g. there may be a slight curvature but for the most part the underside 5 is planar. "Generally" as it relates to the wedge-shape of housing means, as shown, the front edge 2 and back 3 do not necessarily come to an exact point, rather the overall shape equates most to a triangular pyramid but may include curved or rounded edges or rounded vertices. However, important as it relates to the above shape characteristics is that the wedge-shaped cover 1, when disposed on both the latch 15 and buckle 16 of an engaged seatbelt 13, makes a smooth engagement and transition across the buckle 16 to provide an obstruction, but not an undue obstruction, as shown by FIG. 7.

Figure 2:
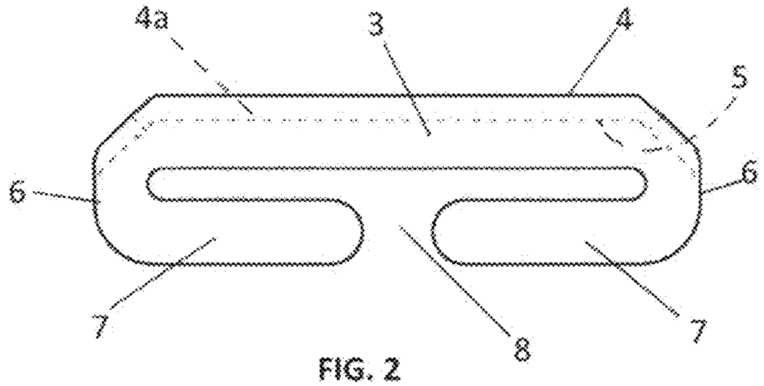
FIG. 2 shows a front elevation view thereof.
Figure 3:
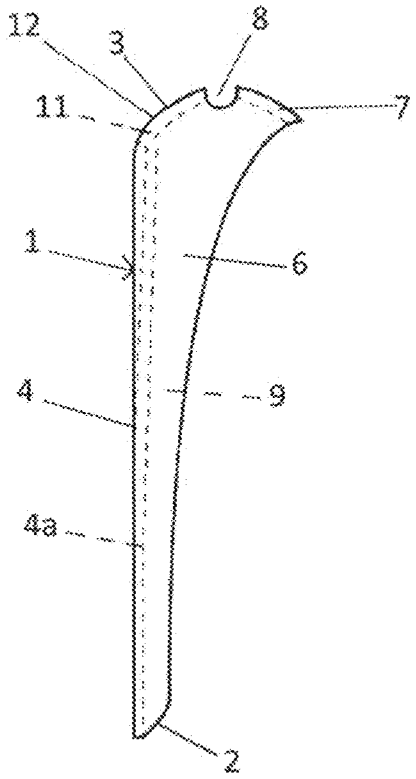
FIG. 3 shows a side elevation view thereof.
Figure 4:
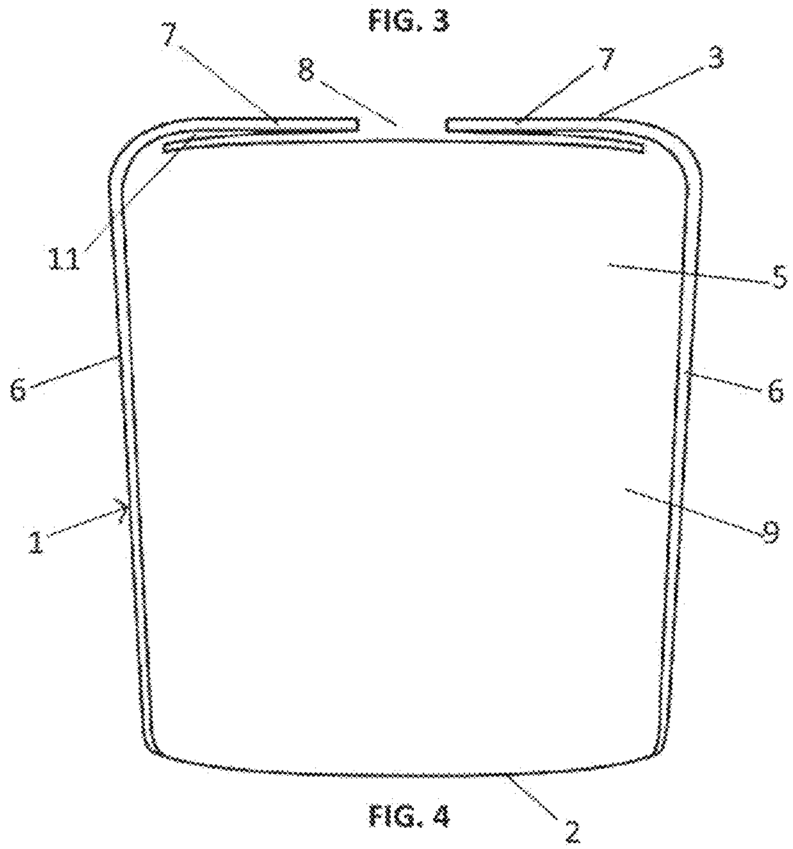
FIG. 4 shows a bottom elevation view thereof.
Figure 5:
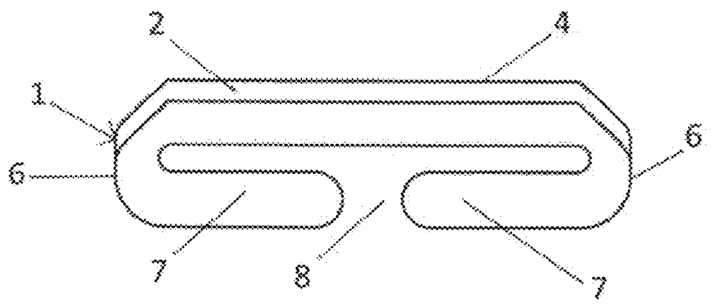
FIG. 5 shows a rear elevation view thereof.
Figure 6:
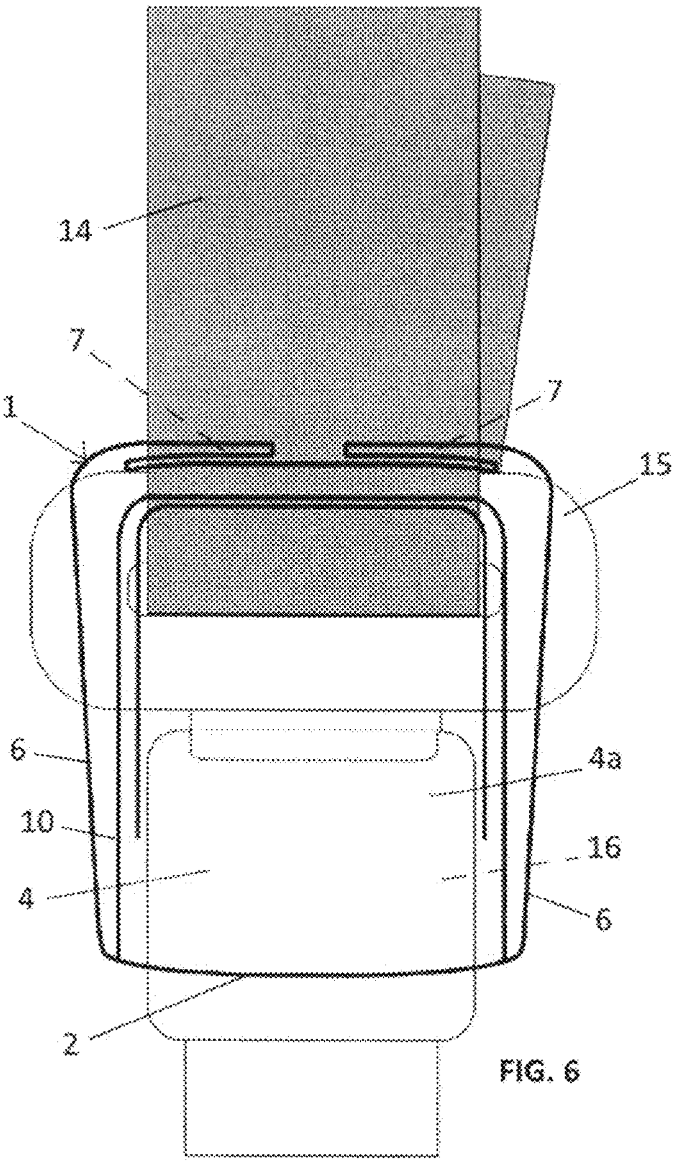
FIG. 6 shows a front elevation view of the device in use, slid down over the seatbelt latch mechanism.

The cover 1, at the back 3, includes a means for frictionally engaging a strap 14 of a seatbelt 13. The means may be accomplished by a clip, clamp, Velcro, or tacky component to the extent the cover 1 can be temporarily held in place along the strap 14 unless and until it is moved along the strap 14 by force. However, in the preferred embodiment as shown a pair of tab members 7 are formed at the back 3. Each tab member 7 is integral and substantially orthogonal to each side 6. "Substantially" as it relates to the tab member 7 means exactly or not exactly orthogonal or perpendicular to the sides 6 as the angle may be more or less, but nearly a ninety-degree bend as shown. The height of each tab member 7 is such that, upon being formed, a generally horizontal slit is defined at the back 3 between the tab member 7 and the underside 5 of the cover 1. The length of each tab member 7 is such that upon formation the tab members 7 do not touch, rather a small gap is formed. In other words, the tab members 7 define a generally T-shaped opening 8 at the back 3 (not exactly a "T", but of similar shape as shown by FIGS. 1 and 2). The width of the gap may vary to the extent it must allow the strap 14 to enter the horizontal slit while also retain the strap 14 therein, but the dimensions of the horizontal slit would approximate the thickness of the strap 14 such that the cover 1 is held on the strap 14 by friction but movable by minimal force. Although not preferred, it is possible that a strap 14 of varying thickness would result in more or no force required to move, in which case the cover 1 might be loose and merely "hang" on the strap, so "slidably retained" is meant to encompass all or no amounts of force required to manipulate. Thus, the T-shaped opening 8 is adapted to receive a strap 14 of a seatbelt 13, thus the cover 1 is slidably retained on the strap 14. Important is that in the preferred embodiment the front edge 2 excludes any frictional engagement means so that front edge 2 can pivot freely. In this manner cover 1 is also "pivotally mounted" because cover 1 pivots about strap 14 with engaged back 3 acting as a fulcrum so that front edge 2 and thus cover 1 can be intermittently lifted then flattened against buckle 16, especially in the instance buckle 16 might be larger in some vehicles versus others.

In use therefore, positioned with top surface 4 facing outward, the cover 1 is initially placed on strap 14 away from latch 15. With the seatbelt 13 unfastened, the seatbelt strap 14 is guided through tab members 7 and thus the apparatus is affixed to the seatbelt 13 (removably secured). Seatbelt 13 as used herein means, collectively, the strap 14, latch 15, and/or buckle 16 as typically comprise a vehicle's driver seat seatbelt 13. As used herein, the strap 14 holds the latch 15, and the latch 15 engages the buckle 16. A driver of a vehicle in the driver's seat fastens his or her seatbelt 13 as would be customary. Upon fastening, the cover 1 is then slid down along strap 14 towards latch 15. The underside 5 is adapted to abut the buckle 16 such that a portion of the buckle is contained with the housing (partially covered by cover 1). As a result, the release button (not shown) of the buckle 16 would be at least partially covered and unexposed unless the cover 1 is manipulated away from the buckle 16.

The tab members 7 provide enough frictional contact with the seatbelt 13 to secure the cover 1, but not so much that the cover 1 cannot be slid up and down along the strap 14 of the seatbelt 13. Accordingly, when the seatbelt is fastened with the apparatus thereon, the apparatus is then slid or urged downward along strap 13. A housing side 11 of back 3 (interior-facing surface of back 3) abuts the latch 15 to prohibit the further downward movement of the cover 1 off the strap 13. The cover 1 extends enough to at least partially cover the latch release button of the seatbelt 13 buckle 16. If the latch release button is upmost on the buckle 16, the latch release button would be entirely covered. If the latch release button is on the face of the buckle 16 (or latch release), the latch release button is at least partially covered. The driver must slide the cover 1 upward to expose the latch release button to thereby release the seatbelt 13 and exit the vehicle. Thus the cover 1 "intermittently" covers a buckle 16. As a result, in order to exit the vehicle the driver will be reminded, because of this exposing maneuver and alert cover existence, that a child or pet may be present in the vehicle. The cover 1 may be brightly covered. include an "alerting" word and/or include the aforementioned indicia or logo. These characteristics and the physical existence of the device itself requiring a separate maneuver adds an awareness factor to the driver's thought process prior to leaving a vehicle, slowing down the hurried, vehicle-exiting process, and thereby serves to remind the driver of the potential presence of an accompanying child or pet.

I claim:

1. An alert apparatus, comprising:

a wedge-shaped cover having a back, an underside, two sides, and a front; and, on said back, a means for said cover to frictionally engage with a strap of a seatbelt, said front adapted to remain unattached to said strap, wherein said cover is pivotally mounted and slidably retained on said strap such that said cover can intermittently cover a buckle of said seatbelt to prohibit release of said seatbelt unless said cover is manipulated away from said buckle; and, a pair of tab members formed at said back, each said tab member substantially orthogonal to each said side, said tab members shaped to define a generally T-shaped opening at said back.

2. The alert apparatus of claim 1, wherein said underside is adapted to abut said buckle of said seatbelt such that a portion of said buckle is contained under said cover, as a result a release button of said buckle is at least partially unexposed unless said cover is manipulated away from said buckle.

3. The alert apparatus of claim 1, wherein said back is adapted to abut a latch of said seatbelt to prohibit further movement of said cover along said strap.

4. An alert apparatus, comprising:

a cover having a front edge, a back, a top surface, an underside and two sides;

said front edge having a front height less than a back height of said back such that said cover generally tapers from said back to said front;

said back and each said side extending down from said top surface with said underside substantially flat to thereby define a wedged-shaped housing;

a pair of tab members formed at said back, each said tab member substantially orthogonal to each said side, said tab members shaped to define a generally T-shaped opening at said back, said T-shaped opening adapted to receive a strap of a seatbelt such that said cover is slidably retained on said strap, as a result, said cover can intermittently cover a buckle of said seat belt.

5. The alert apparatus of claim 4, wherein said underside is adapted to abut said buckle such that a portion of said buckle is contained within said housing, as a result a release button of said buckle is at least partially unexposed unless said cover is manipulated away from said buckle.

6. The alert apparatus of claim 4, wherein a housing side of said back is adapted to abut a latch of said seatbelt to prohibit further movement of said cover along said strap.

7. The alert apparatus of claim 4, wherein said back is rounded off.

8. The alert apparatus of claim 4, wherein a transition from said sides to said top surface is rounded off.

9. The alert apparatus of claim 4, further comprising an indent defined on said top surface.

* * * * *